United States Patent [19]

Hill

[11] Patent Number: 5,161,052

[45] Date of Patent: Nov. 3, 1992

[54] STEROSCOPIC TANDEM SCANNING REFLECTED LIGHT CONFOCAL MICROSCOPE

[75] Inventor: James D. Hill, Mt. Airy, Md.

[73] Assignee: Tandem Scanning Corporation, Reston, Va.

[21] Appl. No.: 677,300

[22] Filed: Mar. 29, 1991

[51] Int. Cl.$^5$ ............... G02B 21/22; G02B 21/06; G02B 27/22

[52] U.S. Cl. .................. 359/377; 359/389; 359/478; 359/235; 359/615

[58] Field of Search ............... 350/507, 527, 516, 515, 350/514, 274, 144, 168

[56] References Cited

U.S. PATENT DOCUMENTS 3,517,980 12/1967 Petran et al. .
4,365,871 12/1982 Muchel ............... 350/414
4,597,634 7/1986 Steenblik ............... 350/144
4,802,748 2/1989 McCarthy et al. .
4,927,254 5/1990 Kino et al. ............... 350/574

OTHER PUBLICATIONS

"Tandem Scanning Reflected Light Microscope", *Science of Bilogical Specimen Preparation*, pp. 85–94, SEM, Inc., AMF O'Hare, Petran et al.

"The Tandem Scanning Reflected Light Microscope", *Scanning*, vol. 7, pp. 97–108 (1985), Petran et al.

*Primary Examiner*—Jon W. Henry
*Attorney, Agent, or Firm*—Howard L. Rose

[57] ABSTRACT

A stereoscopic tandem scanning reflected light confocal microscope employs longitudinal and transverse chromatic aberration in conjunction with color dispersion prisms in a binocular eyepiece assembly to provide a three dimensional vertical view through a specimen.

20 Claims, 4 Drawing Sheets

STEROSCOPIC TANDEM SCANNING REFLECTED LIGHT CONFOCAL MICROSCOPE

FIELD OF THE INVENTION

The present invention relates to stereoscopic confocal tandem scanning microscopes and more particularly to the use of an objective lens in a stereoscopic confocal scanning microscope having both specific longitudinal and transverse chromatic aberration whereby to not only provide stereoscopic effects but to provide proper size ratios in all three dimensions.

BACKGROUND OF THE INVENTION

By convention, the power of a microscope is defined as the ratio of the apparent size of an object viewed with the microscope to the apparent size of the same object viewed with the unaided eye at a distance of 250 mm. More particularly the comparison is made with the microscope so focused that the apparent distance to the object as viewed with the microscope is 250 mm as determined by the required focus of the eye.

When viewing an object at a distance of 250 mm, the angle of convergence of the lines of sight from the viewers two eyes is approximately 15°. Accordingly the conventional 3-D stereo microscope has two objective lenses and two eyepieces arranged to view a point from two directions separated by 15°.

This arrangement of the objective lens limits their numerical aperture to the sine of 7½° or 0.13. Objective lenses with higher numerical apertures would simply interfere with each other when set at a 15° angle to each other. The resolution and hence the maximum useful power of a microscope is proportional to the numerical aperture of the objective lens. Conventional objective lenses with numerical apertures as high as 0.95 are commonly used for high power microscopes and oil immersion objective lenses with numerical apertures as high as 1.30 are available as well. As a result, there are in common use, microscopes ten times as powerful as the most powerful useful stereo microscopes of conventional design.

In addition to the limitation of numerical aperture characteristic of stereo microscopes, the depth of focus of the high numerical aperture objectives of the higher power microscope is so limited that the 3-D stereo effect would be useless.

Many better high power microscopes are fitted for binocular viewing. These microscopes have a beamsplitter, various mirrors, and two eyepieces arranged so that both eyes are used to view an object. In these microscopes, however, both eyes view identical images so that there is no 3-D stereo effect.

OBJECTS OF THE INVENTION

It is an object of the present invention to provide a microscope with a large depth of focus without limiting the numerical aperture of the objective lens or power or resolution of the microscope.

It is a further object of the present invention to provide 3-D stereo viewing for use on such a microscope without further restricting its design.

BRIEF DESCRIPTION OF THE PRESENT INVENTION

Longitudinal chromatic aberration, commonly a fault in lenses, can be used to achieve a large depth of focus. Normally blue light would be focused at a closer point than red light. The results of this method of increasing depth on focus is that while an object at the point focus of blue light will produce a sharp blue image, it will also produce a blurred image in other colors. The resulting images are hard to see so that lenses are generally designed to have as little longitudinal chromatic aberration as possible.

A tandem scanning confocal reflected light microscope described by Petran et al in U.S. Pat. No. 3,517,980 has the property that only the parts of a viewed object which are in focus are seen and light from parts out of focus is excluded. This property of the confocal microscope is separately valid for each wavelength of light used.

Combining an objective lens with longitudinal chromatic aberration with a tandem scanning reflected light microscope results in a microscope with increased depth of focus with each value of depth being associated with a particular wavelength or color of light. The confocal principle eliminates the out of focus colors at each specific depth. A tandem scanning confocal reflected light microscope with chromatically increased depth of field as described above can also be fitted with binocular eyepieces in the normal fashion. Such an arrangement will provide the same image to each eye of the viewer but there will be no 3-D stereo effect.

In the present invention, a color dispersion prism is used in front of each eyepiece so that the two images are offset laterally in opposite directions as a function of wavelength and hence as a function of depth. The result of this combination of elements is a microscope with a large depth of focus and providing for 3-D stereo depth perception. The requirement for longitudinal chromatic aberration imposes no limit on the numerical aperture of the objective lens or on the magnification of the system.

Transverse chromatic aberration is the property of a lens such that different colors of light produce images of different sizes. Normally longitudinal and transverse chromatic aberration are separately eliminated from lenses by proper lens design. The present invention describes the method for separately controlling longitudinal and transverse chromatic aberration so that the apparent size of various parts of an object will be compatible with their apparent depth thus providing proper size ratios in all three dimensions.

DETAILED DESCRIPTION

Figure 1A:
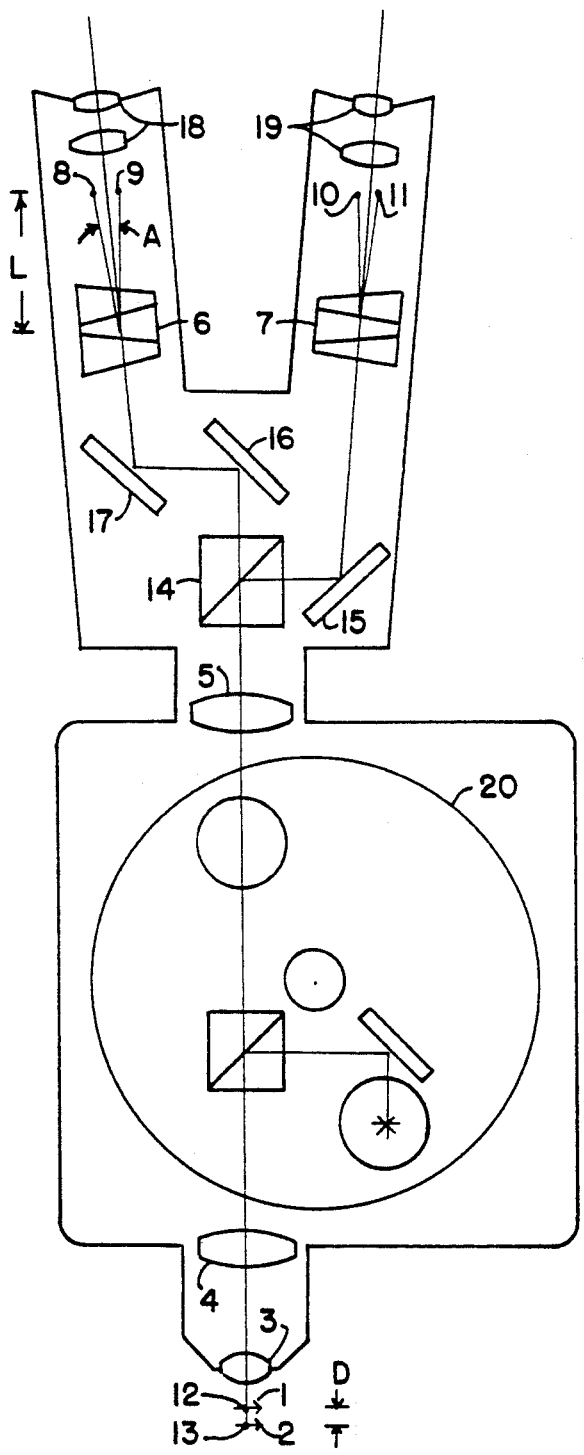
FIGS. 1A and 1B are an overall view of a tandem scanning confocal microscope fitted with binocular eyepieces and the color dispersion prisms and objective lens required for stereo viewing.
Figure 1B:
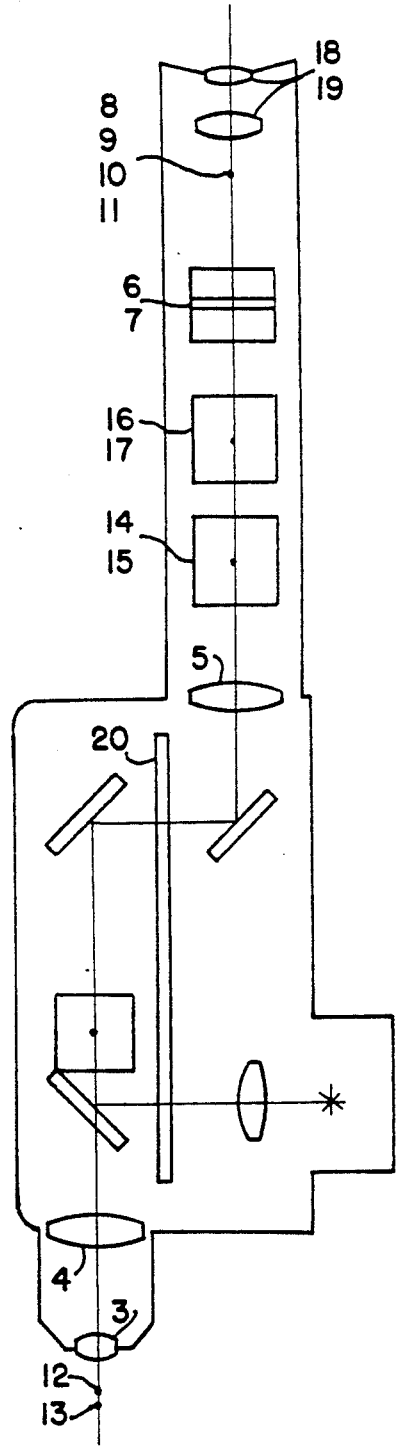

FIGS. 1A and 1B show a schematic layout of a stereo microscope according to the present invention. The following description is based on the characteristics of the microscope at specific wavelengths, however it should be understood that the microscope operates making use of a continuous spectrum of wavelengths. In FIG. 1, the plane of blue focus is shown as an arrow 1 and the plane of red focus is shown as an arrow 2. Intervening colors focus at intermediate planes so that the location of the plane of focus is a continuous function of color or wavelength. The various planes of focus are separated because of the longitudinal chromatic aberration of the objective lens.

The optical path of the present stereo microscope is for the most part the same as other tandem scanning confocal microscopes fitted with binocular eyepieces, the principal differences being the use of chromatic aberrations of the objective lens 3 and color dispersion prisms 6 and 7. A light source 5A provides a continuous spectrum of light required by the system. Blue light is focused to and from point 12 in plane 1 by the objective lens 3. When an infinity corrected objective lens is used, a tube lens is required. The tube lens is shown schematically in FIGS. 1A and 1B as a single element 4. (Lenses 3 and 4 are discussed in detail relative to FIG. 4.) Red light is focused to and from a point 13, plane 2, on the red plane of focus. The blue light from point 12 and the red light from point 13 are both focused at the surface of disk 20 of a confocal tandem scanning microscope. Disk 20 employed is as defined hereinbelow. Focused light passes through holes in the disk 20 as is the normal case with confocal microscopes. Red light from point 12 and blue light from point 13 are out of focus at the plane of the disk and are therefore not passed by the disk holes.

A field lens 6A images the aperture of the objective lens 3 onto the aperture of the relay lens 5. Relay lens 5 is a practical necessity to provide for the optical path length required by the various mirrors and beamsplitter used to facilitate the use of binocular eyepieces. Relay lens 5 focuses the plane of the disk to planes in focus at eyepieces 18 and 19 of the binocular assembly. The relay lens 5 is shown schematically as a single element lens but it should be achromatic and is described in detail subsequently. Blue light originally from point 12 is focused by the relay lens 5 to point 9, said light passing through a beamsplitter 14, reflecting from mirrors 16 and 17, and passing through color dispersion prism 6. Likewise red light originally from point 13 is focused to point 8. In addition blue light from point 12 is focused to point 10 and red light from point 13 is focused to point 11, said light reflecting from the beamsplitter 14 and mirror 15 and passing through color dispersion prism 7. In fact the whole planes of focus 1 and 2 are focused to the planes of focus of the eyepieces with the color dependent offsets indicated by the separation of the points 8 and 9 and the points 10 and 11. A rack and pinion drive 7A is provided to move the prisms 6 and 7 relative to eyepieces 18 and 19 for purposes to be described subsequently. In the event only a single prism is used with a single eyepiece the prism may be rotatable about its light path axis to provide a simulated 3-D effect.

The separation of points 8 and 9 and the separation of points 10 and 11 are due to the color separation properties of color dispersion prisms 6 and 7. These color dispersion prisms are of conventional design for direct view color dispersion prisms. Typically, these prisms are designed so that a color in the middle of spectrum passes through the prism without deflection, other colors being deflected in one direction or the other as a function of wavelength.

In general, the design of the binocular eyepieces and associated beamsplitter and mirrors is similar to the design of binocular arrangements for conventional microscopes and is well within the capabilities of a skilled optical designer. The range of location of the color dispersion prisms 6 and 7 should be determined first by the procedures defined below.

The relay lens 5 should have focal distances compatible with the optical path length through the binocular assembly and the desired image ratio. A Cooke triplet is a good choice for the relay lens but care should be taken that the relay lens be designed for the approximate image ratios to be used. Such lenses are commercially available and are relatively easy to design if desired.

The field lens could be either a double convex or a plano-convex simple crown glass lens. If not symmetrical, the flatter side of the field lens should face the disk 20 and it should be spaced approximately 3 mm from the disk. The focal length of the field lens is given by the formula:

$$1/F = 1/D1 + 1/D2$$

where
F is the focal length of the field lens
D1 is the effective distance from the field lens to the aperture of the objective lens 3
D2 is the approximate distance from the field lens to the relay lens aperture.

D1 is affected by the tube lens if used and is approximately 400 mm for the objective and tube lens combination described below.

In order to design a stereo microscope according to the present invention, the concept of correct perspective should be understood. Correct perspective requires that all three dimensions be magnified by the same factor. Depth must be magnified to the same degree as the two transverse dimensions. The magnification of a conventional microscope is transverse magnification. Correct perspective requires that the transverse magnification must vary slightly with depth because close objects appear larger than distance objects.

As stated before the power of a microscope is defined by the ratio of the apparent size of an object viewed through the microscope to the apparent size of the object viewed with the unaided eye from a distance of 250 mm. The power of an eyepiece is the ratio of the apparent size of an object viewed using the eyepiece as a magnifying glass to the size of the object viewed with the unaided eye from a distance of 250 mm. The power of an eyepiece is approximately 250 mm divided by the focal length of the eyepiece in millimeters. This power definition is also valid when using the eyepiece to view an image as is done in a compound microscope. (A compound microscope is a microscope having both an objective lens and an eyepiece as distinct from a simple magnifying glass.) The power of a microscope objective lens is defined as the ratio of the size of the image of an object produced by the objective to the size of the object itself. The power of a compound microscope is then the power of the objective multiplied by the power of the eyepiece. In the microscope being described herein, this calculation should include the magnification ratio of the relay lens.

$$M = O \times R \times E \qquad (1)$$

where
M is the power of the microscope
O is the power of the objective,

R is the magnification ratio of the relay lens, and
E is the power of the eyepiece.

Figure 2:
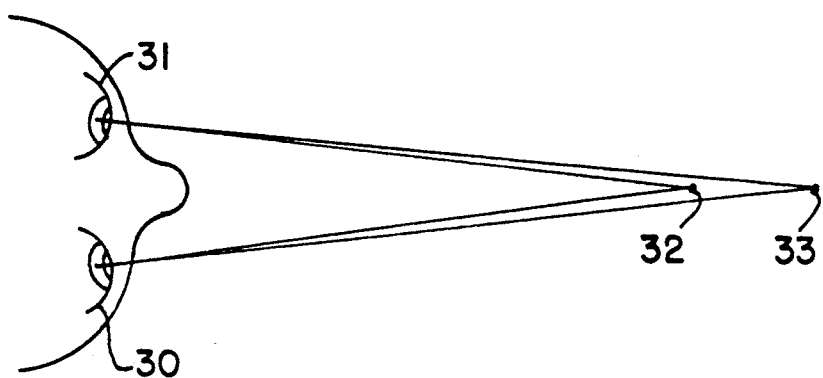
FIG. 2 is a schematic showing the two eyes and the various angles and distances involved in the stereoscopic viewing of two points at different distances.

FIG. 2 shows the desired apparent relation between the eyes of a viewer 30 and 31, and two points on an object being viewed 32 and 33. Point 31, FIG. 2, is analogous to point 12, FIG. 1, and point 33, FIG. 2, is analogous to point 13, FIG. 1. The relationship shown in FIG. 2 does not actually exist but represents how points 12 and 13 of FIG. 1 should appear to the viewer.

Where D is the distance between points 12 and 13 in FIG. 1, the apparent longitudinal distance between point 32 and 33 should be M×D. The approximate apparent lateral distance between point 32 and 33 as viewed by either eye is M×D×Sin 7.5°.

Figure 3:
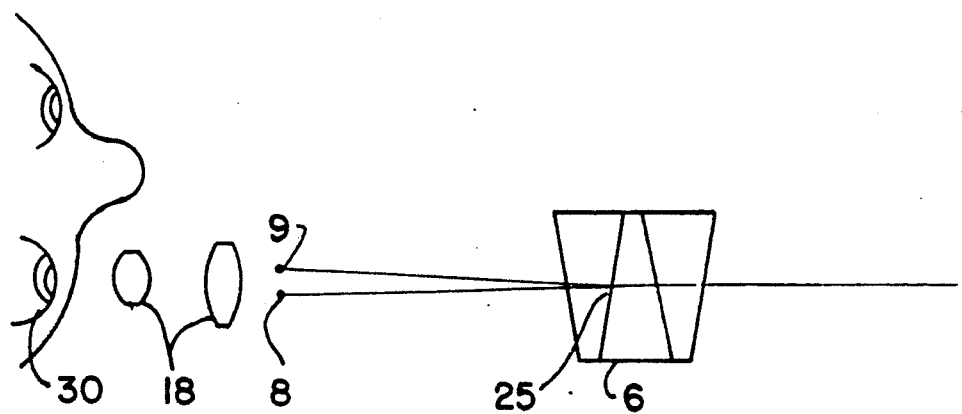
FIG. 3 shows the relationship of the eyepieces and color dispersion prisms for viewing equivalent to FIG. 2.

FIG. 3 shows the relationships required in order that the conditions shown in FIG. 2 will appear to exist. Points 8 and 9 are viewed through the eyepiece 18 and should appear as points 33 and 32 of FIG. 2. Point 9 is analogous to point 32 and point 12 and is seen with blue light. Point 8 is analogous to point 33 and point 13 and is seen with red light. The color dispersion prism 6 refracts red and blue light at different angles and the lateral distance between points 8 and 9 is determined as follows: where A is the angular difference between the red and blue light as refracted by the prism 6
L is the distance between prism 6 and point 8 or 9

The lateral distance between point 8 and point 9 is $$L \times \text{Sin } A \tag{2}$$

The apparent lateral distance between points 8 and 9 is $$E \times L \times \text{Sin } A$$

hence $$M \times D \times \text{Sin } 7.5 = E \times L \times \text{Sin } A.$$

As above $$M = E \times O \times R$$

therefore $$\text{Sin } A = (O \times R \times D \times \text{Sin } 7.5)/L. \tag{3}$$

It should be noted that the value of the angle A determines the design of the color dispersion prism. The angle A is not dependent on the power of the eyepiece. It does, however, depend on the value of the relay lens magnification ratio R. If the relay lens ratio is used to vary the power of the microscope, the distance L can be varied also so that the ratio R/L remains constant. Where it is desirable to change objective lenses, objective lenses can be designed so that the product O×D is a constant. Keeping R/L and O×D constant allows for the design of a versatile microscope without the need for more than one set of color correction prisms. Where the objective lens design does not conform exactly to the requirements of the system, it may be possible to achieve the desired results by adjusting the distance L.

Referring again to FIG. 2, the apparent size of an object apparently located at point 32 should be larger than the apparent size of an identical object apparently located at point 33. This simply means that near objects should appear larger than distant objects. Since objects at point 32 are seen in blue light and objects at point 33 are seen in red light, the desired size difference can be achieved if the value of the objective lens power, O, varies as a function of color wavelength. This variation of power with wavelength T is conventionally termed "transverse chromatic aberration" where T is defined by T=OB/OR
OB is the power of the objective for blue light
OR is the power of the objective for red light For correct perspective, OB should be inversely proportional to the distance from point 32 to the eyes 30 and 31, and OR should be proportional to the distances from point 33 to the eyes. T, therefore, should be equal to the ratio of these two distances. Where 250 mm is the approximate distance from the vicinity of points 32 and 33 to the eyes, 30 and 31, $$T=(250+(M \times D))/250=1+(O \times R \times E \times D)/250$$

T is a function of the objective lens design. Once the objective lens has been designed, the correct perspective will not be maintained if eyepieces of a different power are used or if the relay lens ratio, R, is changed.

It should be noted that the correct perspective is required so that an object or group of objects viewed with the stereo microscope appear undistorted, that is the near and far parts of the viewed volume appear in correct size. The correct perspective is not required, however, to benefit from the stereo effect. Even without attention being paid to the correct perspective the stereo microscope is effective in revealing three dimensional relationships.

Figure 4:
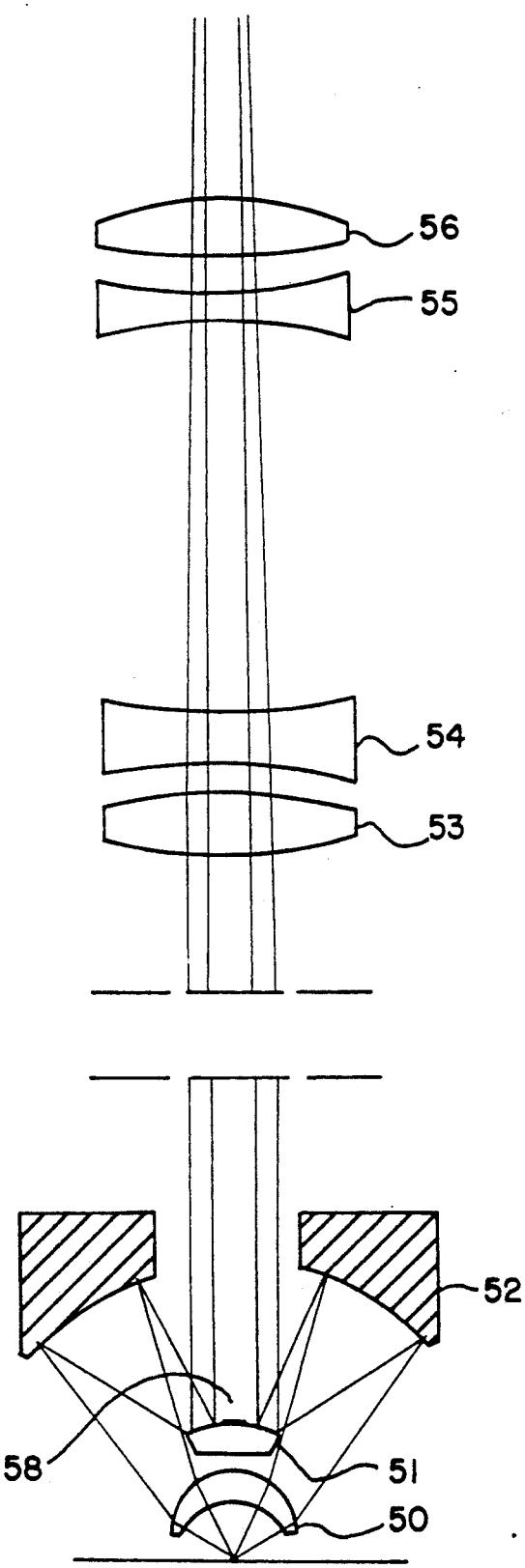
FIG. 4 shows one design for an objective lens suitable for use in the present invention.

Before describing in detail the objective and tube lenses of FIG. 4 it is preferable to consider the design of the color dispersion prisms.

The color dispersion prism shown in the various figures have three elements. Prisms with fewer elements could be used but the wave front distortion is in general less with the three element design. The design described below has one flint glass element sandwiched between two crown glass elements. After selecting suitable glass types, the wedge angles of the elements are determined by ray tracing. For simplicity of mechanical design and compatibility with existing binocular hardware the prisms are designed so that green light is not appreciably deflected.

A typical 1000 power microscope would use a 100 power objective, 10 power eyepieces, and a relay lens ratio of 1. Thus O=100 and R=1. Reasonable values of D and L are D=0.025 mm and L=50 mm.

From the formula $$\text{Sin } A = (O \times R \times D \times \text{Sin } 7.5)/L$$

$$\text{Sin } A = 0.00653.$$

Using a wavelength of 500 nm for blue light and a wavelength of 620 nm for red light the flint glass element has an angle of 27.04° the crown glass elements have an angle of 20.79°. A clear aperture of the color dispersion prisms of greater than 20 mm is available if the thickness is 4.8 mm for the crown glass elements and 6.2 mm for the flint glass element. These thicknesses are measured along a line through the center of the prisms or along the axis of the prisms. This clear aperture should be sufficient for most ordinary designs of stereo microscopes according to the present invention. The effective center or point within the color dispersion prisms from which the distance L is measured is determined by ray tracing. This point, 25, FIG. 3, lies on the axis of the prisms at the interface between the flint glass element and the crown glass element nearest the eyepieces. The fact that this point lies on the interface between two elements is coincidental and may be elsewhere on other prism designs. The design of other color dispersion prisms and the determination of the effective center of such prisms is within the capability of a skilled lens designer.

Referring now to FIG. 4 there is illustrated both an objective lens and a tube lens that may be employed in the present invention. The objective lens 3 comprises an aplanat 50, and two mirrors 51 and 52. The tube lens comprises lens elements 53, 54, 55 and 56. The properties of the objective lens required by this invention a described in preceding paragraphs are the properties of the combination of both the objective lens and the tube lens. In practice, the desired value for D can be most easily achieved by the proper design of the objective while the desired value of T can most easily be achieved by the proper design of the tube lens. Although either T or D can be controlled by either the objective lens or the tube lens, the low power of the elements of the tube lens makes the achievement of high values of D difficult. Likewise the close spacing of lens elements characteristic of objective lenses make high values of T difficult to achieve.

The basic design principle of the objective lens shown in FIG. 4 is to add an element with longitudinal chromatic aberration to an existing objective lens design, in this case a Schwarzschild design. The design of other types of objective lenses with controlled amounts of longitudinal chromatic aberration is well within the capability of skilled lens designers.

The objective lens shown in FIG. 4 is the combination of a Schwarzschild objective and an aplanat 50 of conventional design. The Schwarzschild objective comprises two spherical mirrors 51 and 52.

| Aplanat: | |
|---|---|
| Radii: | 2 mm and 2.23888 mm |
| Center thickness: | 1.745 mm |
| Glass type: | FK 1 |
| Refractive index | Nd = 1.4866 |
| Abbe number | Vd = 84.47 |
| Mirror 51 Radius: | 3.705 mm |
| Mirror 52 Radius: | 10.088 mm |
| Spacing: | |
| Aplanat to mirror 51 | 1.255 mm |
| Mirror 51 to mirror 52 | 6.326 mm |

The spacings are defined as the distance along the optical axis between the specified spherical surfaces. The center portion of mirror 51 is not used. In order to prevent the illuminating rays of light from being reflected directly from mirror 51 toward the disk, a non-reflective spot 58 should be applied to the center of mirror 51. This should be done any time a Schwarzschild objective is used with a tandem scanning reflected light microscope even if it is not a stereo microscope.

The principle of the tube lens design is to use two groups of lens elements, the first group comprising elements 53 and 54, the second group comprising elements 55 and 56. The first group is designed to have a high degree of longitudinal chromatic aberration and to be free of spherical aberration. The second group is separated from the first by some distance and is designed to have no spherical aberration and to compensate for the longitudinal chromatic aberration of the first group so that the two groups combined have no longitudinal chromatic aberration. This practice of introducing longitudinal chromatic aberration in one group and compensating in another group which is separated from the first by some distance results in considerable transverse chromatic aberration. Coma and astigmatism aberrations are corrected between the two groups.

The tube lens comprising elements 53, 54, 55 and 56 has all spherical surfaces with radii R1 through R8 in sequence along the optical axis from the objective lens toward the beamsplitter. The values of these radii, the distance between them, and the material between them are listed below.

| R1 | 32.039 mm | Glass type F2 |
|---|---|---|
| | 4 mm | |
| R2 | −42.499 mm | Air |
| | 2 mm | |
| R3 | −31.636 mm | Glass type BK 7 |
| | 2 mm | |
| R4 | 42.222 mm | Air |
| | 42 mm | |
| R5 | −18.457 mm | Glass type SF 11 |
| | 2 mm | |
| R6 | 13.354 mm | Air |
| | 2 mm | |
| R7 | 20.683 mm | Glass type PSK 53 |
| | 4 mm | |
| R8 | −12.837 mm | |

The optical distance from R8 to the focal plane of the tube lens is 100 mm.

The distance between R1 and the objective lens is not critical but a distance of 40 mm is a practical value.

The glass types, refractive indices and Abbe numbers are:

| 53 | F 2 | Nd 1.6200 | Vd 36.37 |
|---|---|---|---|
| 54 | BK 7 | Nd 1.5168 | Vd 64.17 |
| 55 | SF 11 | Nd 1.7847 | Vd 25.76 |
| 56 | PSK 53 | Nd 1.5523 | Vd 63.45 |

Using 500 nm for blue light and 620 nm for red light as was done for the color dispersion prism design, the characteristic of the objective and tube lens combination can be determined by ray tracing.

$O = 75$
$D = 0.01$ mm
$T = 1.043$

Selecting an eyepiece power, E, of 10 and using a value of Sin A of 0.00653 as was used in the design of the color dispersion prisms above, the values of L and R can be selected to meet the requirements for a stereo microscope with correct perspective. Correct perspective is achieved if the following two equations are satisfied.

$$T = 1 + (O \times R \times E \times D)/250$$

$$\text{Sin } A = (O \times R \times D \times \text{Sin } 7.5)/L$$

Substituting the known value in the first equation, $$1.043 = 1 + R \times 7.5/250 \text{ or}$$

$$R = 0.043 \times 250/7.5 = 1.433$$

Substituting the know values in the second equation, $0.00653 = 0.140/L$ or $L = 0.143/0.00653 = 21.5$ mm The power of the microscope is 1060.

It is clear that although the color dispersion prisms were not designed for the exact microscope which results from the objective lens and tube lens described above, the values of L and R can be adjusted to obtain good results. It is therefore useful that the microscope assembly allow for the adjustment of the relay lens magnification ratio and the position of the color dispersion prism.

Other designs for tube lenses are well within the capabilities of skilled lens designers. Although the desired value of D must be achieved by longitudinal chromatic aberration in the objective lens-tube lens combination, the desired value of T can be achieved all or in part by transverse chromatic aberration in the relay lens 5. It is within the capability of a skilled lens designer to design a relay lens with significant transverse chromatic aberration by using the principles used to introduce such aberration into the tube lens.

Other imaging devices such as film cameras or video cameras may be used with the stereo microscope herein described. The image planes for these imaging devices should be located at the focal planes of the eyepieces wherein lie the points 8, 9, 10 and 11, FIG. 1. Film cameras will allow for the simultaneous taking of a stereo pair of pictures for later use in a stereo viewer. Frame grabbers are available for taking single frames from video cameras for the same or like purposes.

Described above are the special components required to make a stereo microscope with correct perspective. There is a value to microscopes with less than the full implementation of features described. When an object in view is moved transversely the nearer parts of the object appear to have a higher transverse or proper motion than the more distant parts.

This difference in proper motion results in a 3-D effect even when only one eyepiece and no color dispersion prism is used. In fact, if a video camera or single eyepiece is used, even without the binocular head or color dispersion prisms, this difference in proper motion still provides the 3-D effect which a one-eyed person can have by moving his head from side to side.

Where transverse chromatic aberration is not used to provide correct perspective, this single eyepiece 3-D effect will not be present, however, the longitudinal chromatic aberration results in a much greater depth of focus than can otherwise be achieved with a numerical aperture as high as that of the objective described above. Even with such a simple system, the large depth of focus is useful because it allows for the perception of a 3-D effect when the object being viewed is rotated on a transverse axis through the object.

Even without rotating the object, the apparent color of various features of the view object provides depth information.

A stereo microscope can be designed as described above comprising an objective with longitudinal chromatic aberration, a binocular eyepiece arrangement, and color dispersion prisms but without the use of controlled transverse chromatic aberration. Such a microscope does not have correct perspective but will nonetheless provide 3-D stereo. It should also be noted that the transverse chromatic aberration can be provided by the relay lens 5.

The 3-D stereo effect will be present even if a color dispersion prism is used in the path of only one of the two eyepieces.

A microscope designed as above but with only one eyepiece and one color dispersion prism can produce a 3-D effect if the one color dispersion prism is moved along the optical axis as to vary the value of the distance L, this being achieved by use of the rack and pinion arrangement 7A. This change in L has an effect similar to rotating the object on a transverse axis. Rotating the color dispersion prism on its axis results in an apparent nutation of the object with a resulting 3-D effect. When an imaging device such as a camera is used, a stereo pair of images can be produced by rotating the color dispersion prism 180° between the recording of the two pictures or frames.

Figure 5:
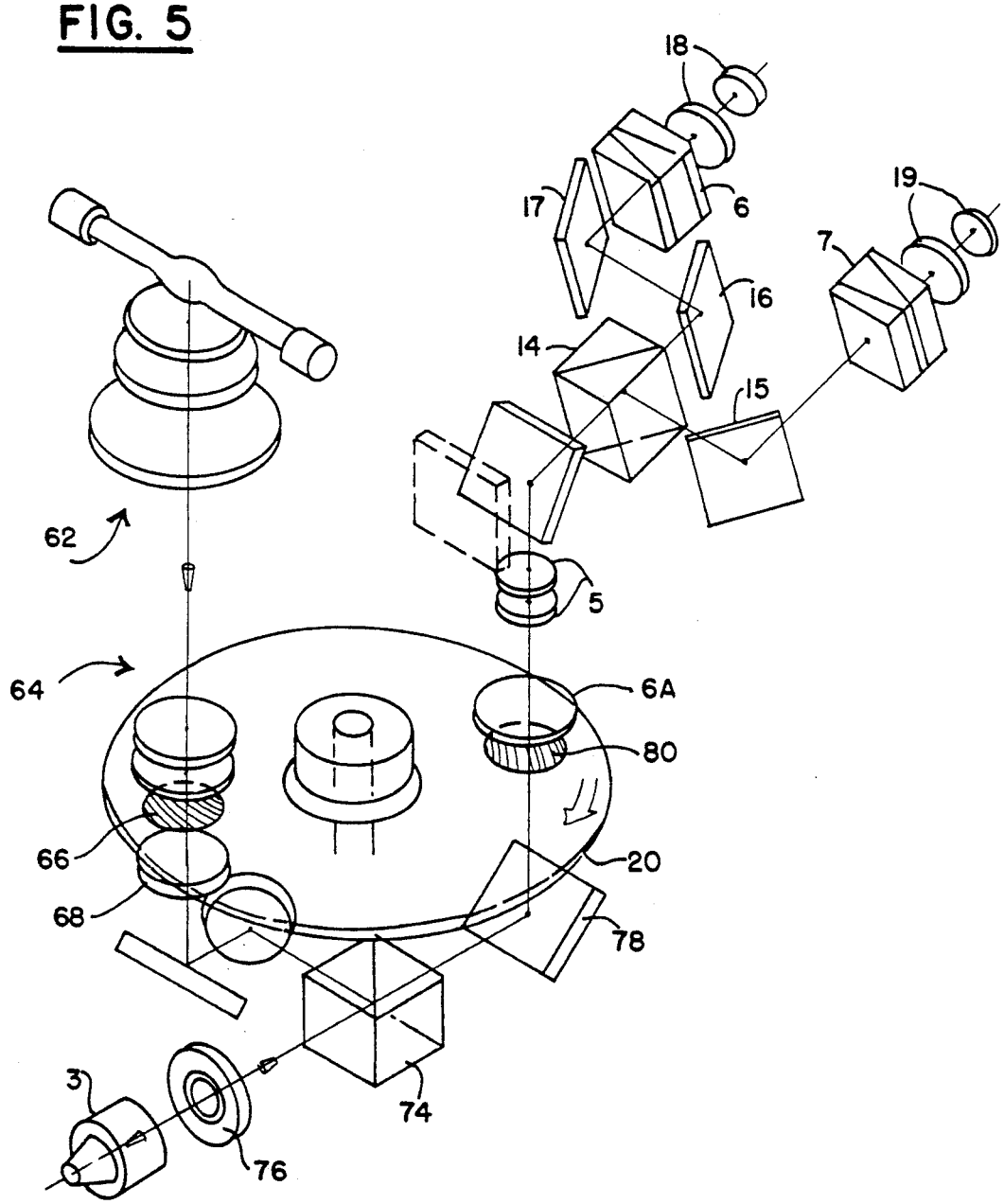
FIG. 5 is a perspective view of the entire stereo microscope system.

The tandem scanning confocal microscope of FIGS. 1A, 1B and 5 is not precisely as illustrated in the Petran et al patent but is as illustrated in my copending U.S. patent application Ser. No. 07/623,102, filed Dec. 6, 1990, and entitled Confocal Tandem Scanning Reflected Light Microscope; the disclosure of which in its entirety is incorporated herein by reference. The principles underlying the operation of the present invention, however, are equally applicable to both Petran et al, my copending application as well as others such as the Scanning Confocal Optical Microscope described by Kino et al in U.S. Pat. No. 4,927,254. The disk 20 illustrated herein is as described and illustrated in such application. The disk, however, may be a disk suitable for use in tandem scanning reflected light confocal microscopes and when the term "disk" is used herein it refers to such a disk.

Referring now specifically to FIG. 5 of the accompanying drawings, the entire stereo system is illustrated in perspective. The basic tandem scanning microscope illustrated is that disclosed in the aforesaid copending application Serial No. 07/623,102. A light source 5A directs light through a multielement condenser lens 62 and via infrared and ultraviolet light filters 64 through a first region 66 of the disk 20 and thence to a fine adjust tiltable window 68. The filtered light from source 5A then proceeds via internal mirrors 70 and 72 to beamsplitter 74 that directs light via a one-quarter wavelength retarder 76 and objective lens system 3 to the specimen, not illustrated. The objective lens system 3 in this FIG. 5 may be of the type described in FIG. 4 and require a tube lens or may be of other suitable type that does not require a tube lens. The objective and tube lenses of FIG. 4 are preferred if correct perspective is desired.

Light reflected from the specimen is reflected back through retarder 76 to the beamsplitter 74.

The retarder lens 76 is employed to provide polarized light to the beamsplitter 74 at right angles to the original polarization to provide maximum light separation and thus efficiency.

Light from the beamsplitter is directed to another internal mirror 78 and thence through a second region 80 of the disk disposed at 180° to the first region 66 of the disk. The light proceeds through the field lens 6A to relay lens 5 and thence through the binocular system previously described and including elements 6, 7 and 14–19.

Both of the chromatic aberrations referred to herein are first order chromatic aberrations. Higher order chromatic aberration cannot provide stereoscopic effects.

Once given the above disclosure, many other features, modifications and improvements will become apparent to the skilled artisan. Such features, modifications and improvements are, therefore, considered to be a part of this invention, the scope of which is to be determined by the following claims.

What is claimed is:

1. A stereoscopic scanning reflected light confocal microscope having a scanning disk, a light source and optics for directing light from said source through said scanning device to a specimen and as reflected from a specimen passing light in focus to a viewing station through a conjugate region on said scanning disk opposite the region through which light was directed to the specimen there being an imaging device located at the viewing station, said microscope being characterized by said imaging device being a binocular imaging device, a pair of direct vision dispersing prisms disposed between the scanning device and the imaging device along the axis of the reflected light to separate wavelength of light at the imaging device, and a beam splitter for directing reflected light along a different path to each said dispersing prism, an objective lens having substantial primary longitudinal chromatic aberration to provide a depth of focus that produces a sharp image at the viewing station for a different distance of said dispersing prism from the viewing station for each color of the light spectrum reflected from a different depth of a specimen.

2. In a tandem scanning reflected light confocal microscope according to claim 1 wherein said prism is movable along of the reflected light.

3. A tandem scanning reflected light confocal microscope having a rotatable scanning disk, a light source providing substantially all colors of the light spectrum and optics for directing light from the source through the scanning disk to a specimen and optics for directing light reflected from a specimen to a viewing station through a region on the disk that is a conjugate to the region through which the light was directed to the specimen and an imaging means at the viewing station, said microscope characterized by a direct vision dispersing prism located between the scanning device and the viewing station imaging means along the axis of the reflected light whereby to separate colors of the reflected light at the imaging device, and an objective lens having substantial primary longitudinal chromatic aberration sufficient to provide a discernable different depth of focus in a light penetrable specimen for each color of the light spectrum whereby light of different wavelengths is reflected from different depths of the specimen.

4. In a tandem scanning reflected light confocal microscope according to claim 3 wherein said prism is rotatable about said axis.

5. In combination with a scanning reflected light confocal microscope for viewing a light penetrable and reflecting specimen, a scanning disk, an objective lens system having in focus substantial primary longitudinal chromatic aberration sufficient to focus different wavelengths of white light at different depths of a specimen, a stereoscopic imaging device, a light path from a specimen to said scanning disk, said light path directing light that is in focus at said scanning disk through said scanning disk to said stereoscopic imaging device, means for splitting reflected light passing through said scanning disk into two generally parallel light paths to said stereoscopic imaging device, a color dispersing prism located between said means and at least one of the imaging devices of the stereoscopic imaging device to focus different wavelengths of light at different locations relative to said imaging device.

6. A combination according to claim 5 wherein there is provided a different direct vision dispersing prism located between said means and a different one of each of said stereoscopic imaging devices.

7. A tandem scanning reflected light confocal microscope according to claim 3 wherein the orientation of the prisms relative to said viewing station is variable whereby to present different colors to the viewing station.

8. In a tandem scanning reflected light confocal microscope according to claim 1 or claim 2 or claim 4 or claim 5 means for introducing substantial transverse chromatic aberration along the light path from a specimen to said stereoscopic imaging device whereby to change the magnification of the image reflected from a specimen as an inverse function of depth of the specimen from which the light is reflected.

9. In a tandem scanning reflected light confocal microscope according to claim 8 wherein said means for providing transverse chromatic aberration comprises a tube lens disposed between said objective lens system and said scanning device.

10. In a tandem scanning reflected light confocal microscope according to claim 9 wherein said tube lens has a first group of lenses for introducing longitudinal chromatic aberration and a second group of lenses correcting longitudinal chromatic aberration whereby to produce transverse chromatic aberration.

11. In a tandem scanning reflected light confocal microscope having a scanning device, an objective lens system producing images of different colors focused at the scanning device for different depths of a specimen relative to the light path from the specimen to the scanning device, an imaging device, and at least one direct vision dispersing prism located between the scanning device and an imaging device.

12. A microscope having a scanning device and optics which permit only light images from an objective lens system that are in focus at the scanning device to pass via the scanning device to a stereoscopic imaging device, further comprising an objective lens system with sufficient primary longitudinal chromatic aberration to cause light of different wavelengths to focus at different depths of a light reflective specimen, and a color dispersing prism located in the reflected light path between the scanning device and the eyepiece.

13. A microscope according to claim 12 wherein said stereoscopic imaging device is a binocular having two eyepieces, means for splitting the light passing via the scanning device to the binocular eyepieces into two light paths and a different color dispersing prism located in each of the two light paths.

14. A microscope according to claim 13 further comprising means for introducing into the light path substantial transverse chromatic aberration prior to the means for splitting the light to provide magnification of the images reflected from the specimen as an inverse function of the depth in the specimen from which the light is reflected.

15. A microscope according to claim 12 wherein said objective lens system comprises an aplanat and a first and a second mirror, a first of said mirrors having a central aperture and a curvature and positioned to receive light passing through said aplanat and reflecting it to said second mirror and said second mirror collimating light reflected from said first mirror and directing it through said central aperture.

16. A microscope according to claim 15 comprising a tube lens located between said objective lens and said scanning device, said tube lens providing the transverse chromatic aberration.

17. A stereoscopic scanning reflected light confocal microscope comprising a scanning device, an objective lens for directing light to a specimen an from a specimen to a scanning device, a binocular viewing device having two separate eyepieces, an optical system for passing through the scanning device only light in focus at the scanning device and directing light passing through said scanning device to said eyepieces along separate paths, a different color dispersing prism located in each of the light paths to each said eyepiece, and optical members for introducing substantial primary longitudinal and substantial transverse chromatic aberrations into the light path from a specimen to said prism.

18. A method of introducing three dimensional viewing into a scanning reflected light confocal microscope comprising passing light to a specimen, which light is subjected to substantial primary longitudinal chromatic aberration to cause the light of different wavelengths to be reflected in focus through the scanning device from different depths of a light reflective body, passing the light reflected from the specimen through a scanning device of such a microscope, and passing the reflected light through a color dispersing prism means to each lens of a binocular imaging device of the microscope.

19. A method according to claim 18 comprising the further step of subjecting the light that has been subjected to substantial primary longitudinal chromatic aberration to substantial transverse chromatic aberration sufficient to produce magnification of the reflected image as an inverse function of the depth in the body from which the light of each wavelength is reflected.

20. A light image viewing device having a lens located in a light path for focusing white light onto a variable depth light reflective object and for receiving light reflected from the specimen and directing it to a further optical system, said lens having sufficient primary longitudinal chromatic aberration to provide a different detectable depth of focus in the object for light of different wavelengths, said optical system comprising an imaging means, a direct vision dispersing prism located along the path of reflected light between said lens and said imaging means whereby light of different wavelengths are located at different positions relative to said imaging means, and means for positioning said prism relative to said imaging means such that light of substantially only one wavelength is presented to the imaging means for each position of said prism, and means located along said light path before said prism for passing only those wavelengths that are in focus at said means.

* * * * *